C. L. BURDICK.
PACKETING MACHINE FOR COINS AND OTHER ARTICLES.
APPLICATION FILED MAR. 7, 1913.

1,171,411. Patented Feb. 15, 1916.
9 SHEETS—SHEET 1.

Witnesses
Leonard S. Greek
Roysting

Inventor
Charles Laurence Burdick

C. L. BURDICK.
PACKETING MACHINE FOR COINS AND OTHER ARTICLES.
APPLICATION FILED MAR. 7, 1913.

1,171,411.

Patented Feb. 15, 1916.
9 SHEETS—SHEET 4.

Witnesses
Lenard S Brock
Roysking.

Inventor
Charles Laurence Burdick

UNITED STATES PATENT OFFICE.

CHARLES LAURENCE BURDICK, OF LONDON, ENGLAND.

PACKETING-MACHINE FOR COINS AND OTHER ARTICLES.

1,171,411. Specification of Letters Patent. Patented Feb. 15, 1916.

Application filed March 7, 1913. Serial No. 752,666.

*To all whom it may concern:*

Be it known that I, CHARLES LAURENCE BURDICK, citizen of the United States of America, residing at Wood Green, London, England, have invented new and useful Improvements in Packeting-Machines for Coins and other Articles, of which the following is a specification.

My invention relates to the class of machines which are used for wrapping or packeting coins or other articles and is designed to quickly and securely wrap in paper or other suitable covering, coins or other articles, whereby a saving in time is effected and a neat and secure covering is obtained; and to provide a machine simple in its construction and efficient in operation.

The article or articles to be packeted may be placed in the machine by hand or be fed to the machine from another machine such (for instance) as a coin counting machine which would automatically deliver the correct quantity.

For the purpose of this description I will use the word "coins" as representing any article to be packeted.

Broadly described the machine is designed to receive paper from a continuous strip or roll, form a receiving coil of paper into which the coins are introduced, tighten up the paper around the coins, cut the paper from the strip, complete the cylindrical wrapping, spin a ridge on interior of packet, press down in folds the projecting paper at the ends of the package, tuck under the final fold and eject the packet from the machine and provide a magazine for the reception of one lot of coins while a previous lot are being packeted.

By reference to accompanying drawings

Figure 1:
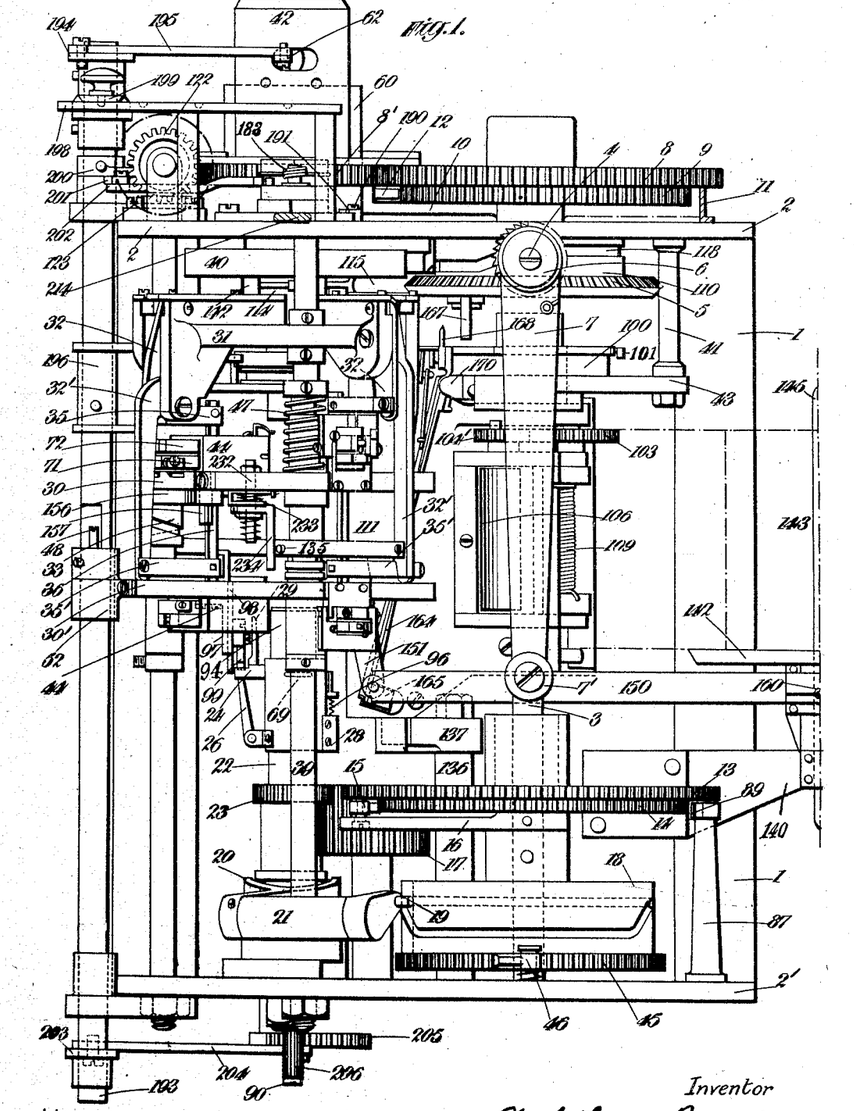
Figure 1 represents a front elevation view leaving out the packet holder for the purpose of clearness.
Figure 4:
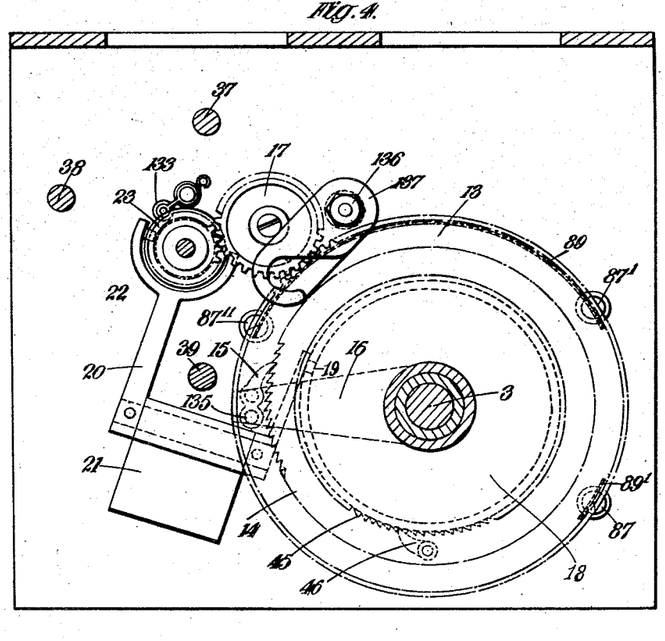
Fig. 4 plan showing details in lower part of machine.
Figure 5:
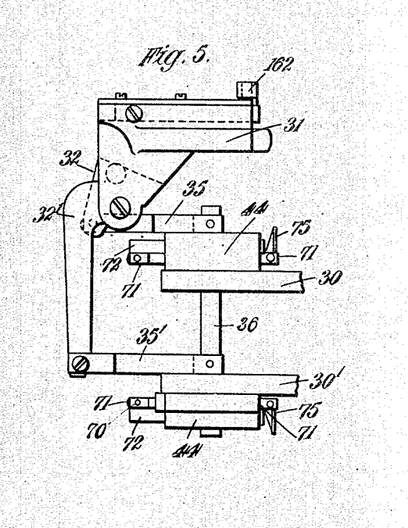
Figs. 5 and 6 details of folders.
Figure 7:
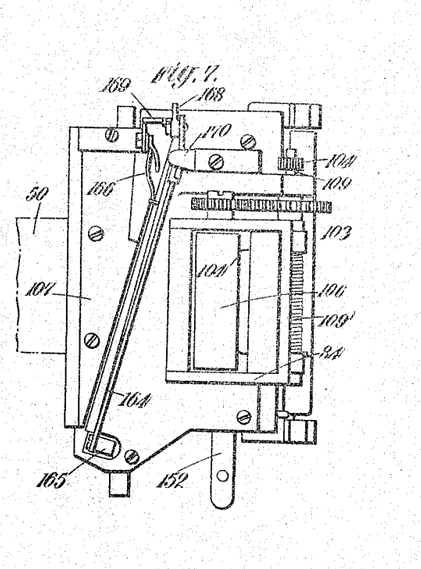
Figs. 7 and 8 details of paper chute and knife.
Figure 8:
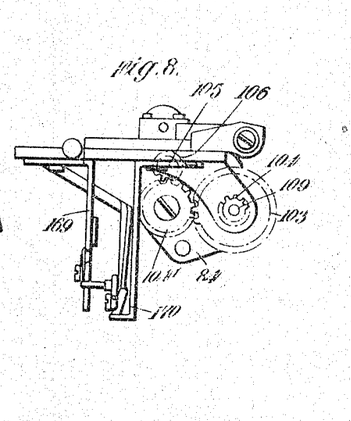
Figure 9:
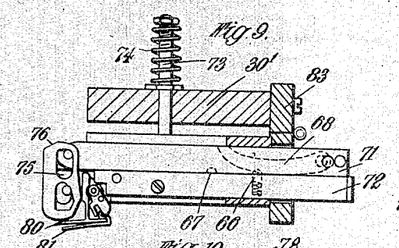
Figs. 9, 10 and 11 details of folders and mechanism for tucking under the final fold.
Figure 10:
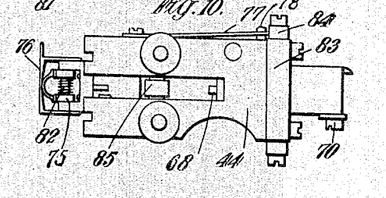
Figure 11:
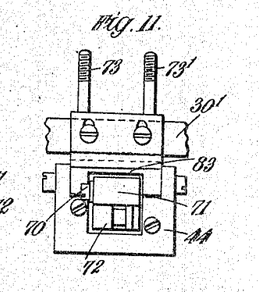

By reference to drawings, 1 indicates a frame carrying the brackets 2 and 2', mounted in these brackets is a shaft 3 which I call the driving shaft. This receives momentum through beveled gears 5 and 6 from a horizontal shaft 4 to which is attached a crank arm 7 with handle 7'. The driving shaft successively communicates motion to the folding mechanism through the gear wheels 8 and 8', to a paper feed roller 106 through the wheels 102, 103, 104, 104' and 105 (Figs. 7 and 8) and to the winding mechanism through the gear wheels 13, 17 and 23 (Figs. 1 and 4). A cam wheel 110 mounted on the driving shaft operates a telescoping tube near the top of the machine and another cam wheel 18 raises and lowers periodically the winding mechanism. Provision is also made for the driving shaft to operate the knife 164 which cuts the paper. The gear wheels are mounted free on the driving shaft and are moved intermittently by being secured to ratchet wheels which are driven by arms rigidly secured to the shaft and carrying pawls which may be thrown in or out of engagement with the ratchet wheels.

Figure 18:
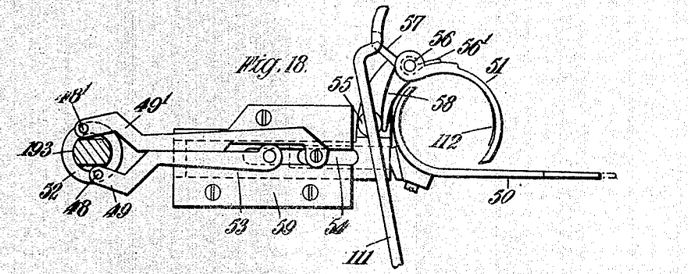
Figs. 18 and 19 details of packet holder.
Figure 19:
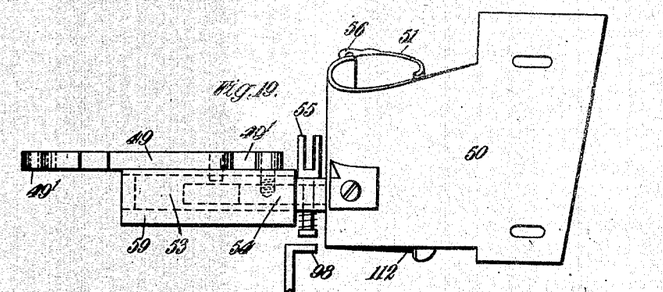

Near the center of the machine is a packet holder shown in detail, Figs. 18 and 19. This packet holder is made in two sections, 50 and 51. The section 51 being hinged at 56 and is kept by a spring 56' normally closed. These two sections are made adjustable in relation to each other to receive different sizes of coin. The section of the packet holder 51 is hinged to a piece having the extension 53 which is fitted to slide in a framework or guide 59 mounted on the bracket 30'. The other section of the packet holder 50 has an extension 54 fitted to slide inside of piece 53, links 49 and 49' and pins 48 and 48' connect with an adjusting rod 193, which being turned reduces or increases the distance apart of 50 and 51 to accommodate various sizes of coins. The piece 50 is kept upright and in alinement by a wing or extension shown better in Fig. 19, which is made to engage with the paper chute. The hinged portion of the packet holder is provided with a lug 57, which is engaged by a projection on an arm 111, this arm is attached to one of the folders by means of which it is made to swing open the hinged portion 51. The section 51 is spring actuated and is closed by tripping the piece 111 which engages the lug 57. A small projection 112 at the lower edge of the piece 51 projects inward and performs a spinning operation on the coin packet making an interior ridge just below the bottom coin which keeps the coin from dropping out. The spring actuated piece 55 serves as a guide for the arm 111 and is raised or tripped at certain intervals to disengage the piece 111 from the lug 57 to close the gate 51 as will be described more fully later on. Attached to the piece 51 is an arm 58 which swings inward when the gate is opened and ejects the finished packet.

The packet holder may be made to accommodate longer packages by providing extensions at the top for the pieces 50 and 51 kept in alinement by guides and so arranged as to be raised and lowered by arms extending from the platform 30.

Figure 12:
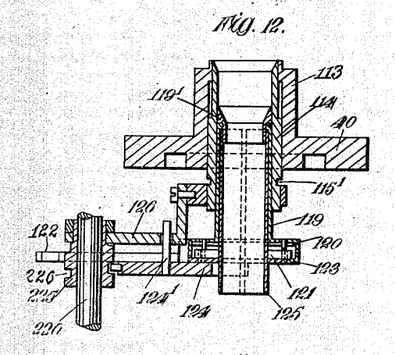
Figs. 12 and 13 details of telescoping tube.
Figure 13:
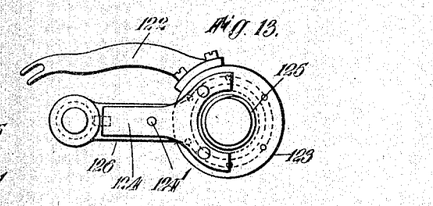

Above the packet holder and attached to the hollow spindle 113 is a telescoping tube 114, shown in detail in Figs. 12 and 13. The telescoping section is moved up and down in the spindle by a forked arm 115 engaging in the groove 115' and extending from a shaft 116 mounted in bearings 116', another arm 117 from the other end of this shaft engages with a groove 118 in the cam wheel 110 and periodically raises and lowers the telescoping tube. I also provide means for lengthening this tube and increasing and decreasing its diameter. A telescoping piece 119 fits in the interior of tube 114 and is provided with an arm 124 which is extended to engage with a helical groove 226 in the piece 225. When the shaft 220 is rotated the arms 126 and 124 are brought nearer or farther apart and the tube 119 is raised or lowered in its relation to tube 114. A guide pin 124' keeps the two arms in alinement, a small pin on the interior of the cylinder 225 engages with a groove 224 in the shaft 220 and allows the cylindrical piece 225 free movement up and down for the telescoping action of the arm 115. To secure an adjustment of the diameter of this telescoping tube I provide an inner thin coil tube 125 suspended at its upper end beneath a conical shaped member 119'. An enlargement of the tube 119 forms a chamber in which are mounted a series of small cams having bearing edges impinging on the circumference of 125, one portion of this chamber is rotatable in relation to the other part and is provided with an arm 122 having a fork which engages with a rod 197 attached to a bracket on the shaft 193 so that when this shaft is rotated the lugs will press on the tube 125 and increase or decrease its diameter. The engagement of the lever 122 with the rod 197 is such as to permit of free movement up or down of the telescoping tube.

The details of the cams 121 are the same as are employed in the regulation of the diameter of the coin magazine and are more fully described later on and shown in detail in Figs. 15 and 16.

Mounted on the bracket 2' is a hollow stud 27 carrying a spindle 22 which is driven by gear wheels 13, 17 and 23. The gear wheel 13 to which is attached a ratchet toothed rim 14 is mounted free on the shaft 3; mounted rigidly on the shafting is an arm 16 carrying a spring actuated ratchet pawl 15; this ratchet pawl has an arm with roller 135 which is intercepted by a rigidly secured casing 89, 89' at certain intervals and thrown out of its engagement with the ratchet rim attached to the gear wheel 13 to secure intermittent movement of the winding apparatus. A spring actuated detent 133 engages notches in a disk 134 carried by the spindle 22 to arrest momentum when the driving mechanism is disconnected and the parts are at rest. The spindle 22 is raised and lowered periodically by means of a cam 18 in a manner similar to that described for the telescoping tube at the top of the machine, a bifurcated arm 20 fits in a groove of the spindle and is attached to a shaft mounted in a bracket 21 carrying another arm with roller 19 which travels in a groove in the rim of cam 18. Near the top of the spindle is mounted a crosspiece 24, having an interior spring 29'. This crosspiece carries an upright arm 29 which grips the paper by pressing into a groove in the cylindrical piece 94. The piece 24 is operated by a lever 26 which in turn is operated by faces 27', 27'' on the stud 27.

95 is a spring actuated catch which engages with the end of the cross-piece 24 and prevents the finger 29 from closing with the piece 94 until the spindle 22 has been raised nearly to its highest position. This catch is tripped by the cam 27' on the stud 27. The action of the lever 26 is to depress the spring 29' without closing the arm 29 until the piece 95 is withdrawn when the arm is closed by the action of the spring.

Figure 2:
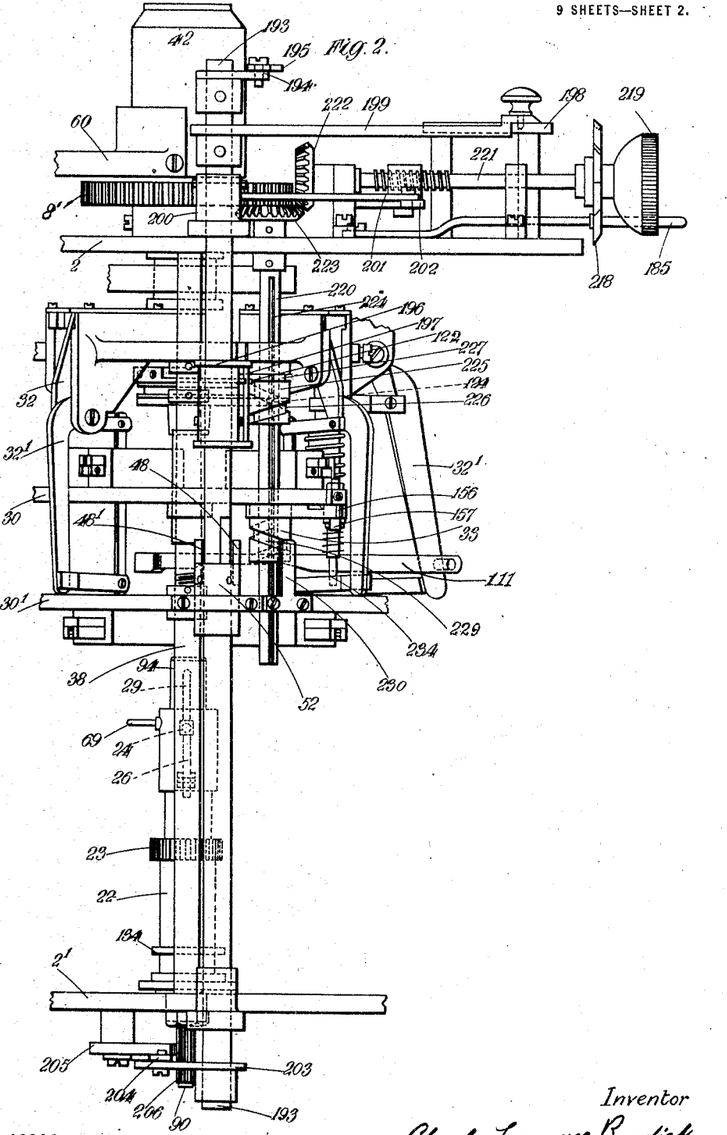
Fig. 2 details of side elevation.

The piece 94 is made of thin metal and forms a cylindrical coil secured to one of the pieces 93 at the point where the finger 29 engages. Provision is made to expand this piece 94 to suit various sizes of coin. For this purpose I provide four pieces 93 having cam faces on their inner profile which engage cam faces 92' and 92'' on the end of an upright piece 92, the piece 92 acts as a wedge to separate the pieces 93 expanding the coil cylinder 94. As it is necessary to arrange this adjustment so that it will permit of the raising and lowering of the spindle as well as to permit it to rotate I swivel the piece 92 on to the end of an extension piece 90 which is raised and lowered by being turned in the threaded nut 91 which is positioned within the hollow stud 27 and prevented from turning by having arms on either side which are fitted to grooves cut in the walls of the stud. The adjustment is effected by turning the adjusting rod 193 (Figs. 1 and 2). A bracket 203 on this rod is connected by a link 204 with a geared segment 205 mounted on a stud below the bracket 2′ and engaging with gear teeth 206 cut on the rod 90.

Figures 20, 21, 21A:
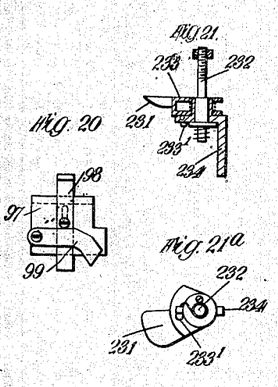
Fig. 20 details of closing mechanism for packet holder.
Figs. 21 and 21ᵃ details of platform regulator.
Figure 22:
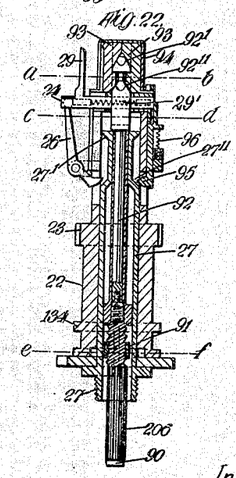
Figs. 22, 23 and 24 details of packet winding mechanism.
Figure 23:
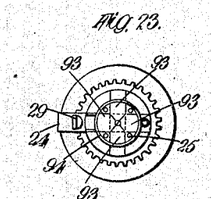
Figure 24:
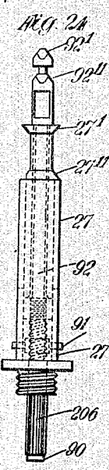
Figure 25:
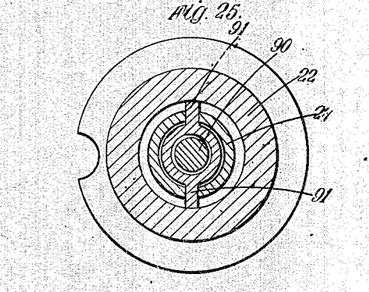
Fig. 25 is an enlarged sectional view through the lines $e-f$ of Fig. 22.
Figure 26:
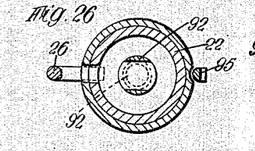
Fig. 26 is an enlarged view through the lines $c-d$ of Fig. 22.
Figure 27:
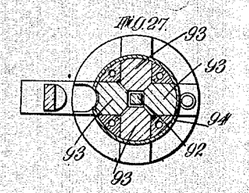
Fig. 27 is an enlarged sectional view through the lines $a-b$ of Fig. 22.

Attached to 22 is a projecting arm 69 (Figs. 1 and 2) which is used to trip the rod 111 and close or partially close the gate 51. The details of this tripping arrangement are shown in Fig. 20 in which 98 is an upright piece sliding in a bracket 97 and engaging with the bottom of the guide post 55. A lever 99 is intercepted at intervals by the piece 69 and the piece 24 to secure partial and complete closing of the gate 51.

Figure 3:
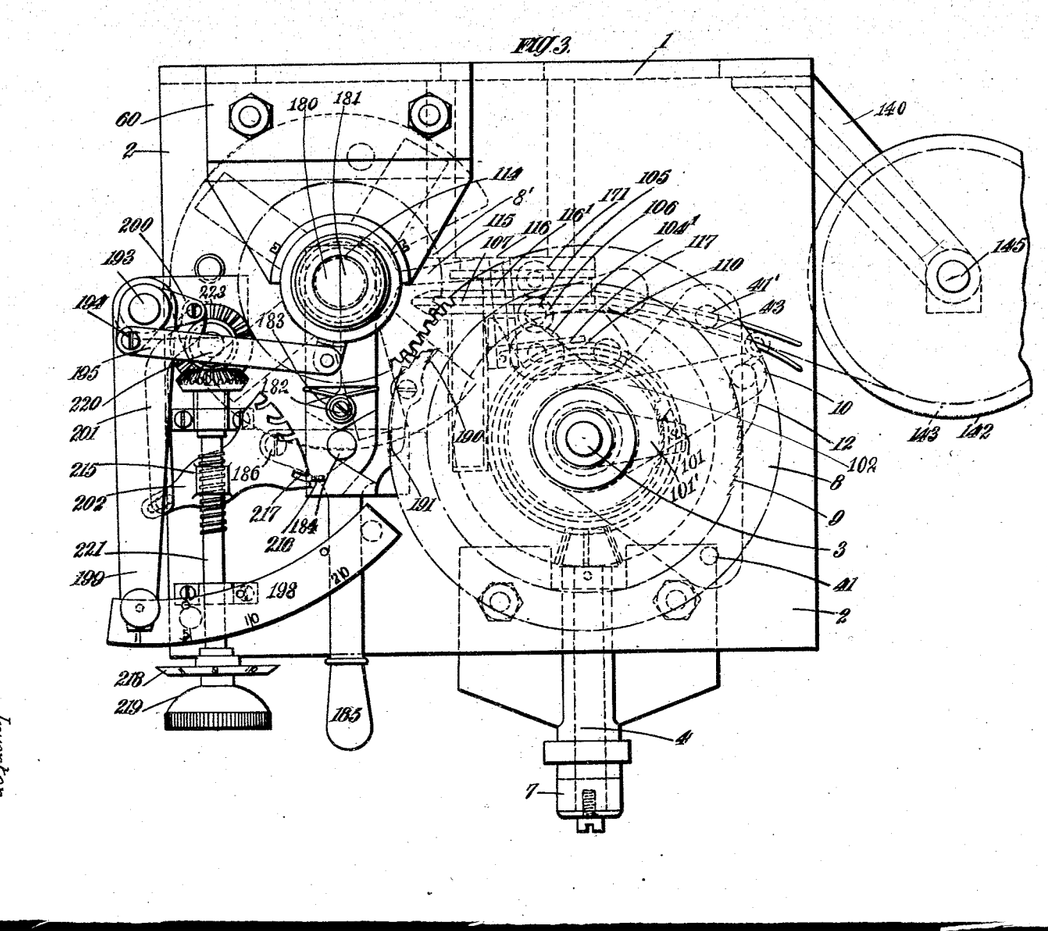
Fig. 3 plan showing details of upper part of machine.
Figure 17:
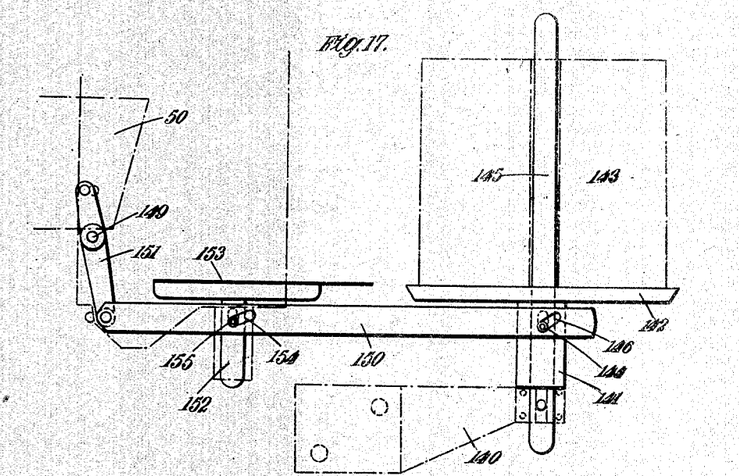
Fig. 17 showing adjustment for bottom of coin chute and paper holder.

A bracket 140 supports a spindle 141 in which slides a shaft 145 carrying a bracket 142 which is intended to support a roll of paper 143. This paper is fed into the machine through a chute illustrated in Figs. 7 and 8, in which 106 is a feed roller driven through the intermediate gears 103, 104, 104′ and 105 from a free gear wheel 102 (Fig. 3) mounted loose on the shaft 3 and carrying a ratchet rim which receives motion from an arm 101′ secured to the shaft carrying a ratchet pawl 101 in a manner similar to that described for the winding spindle. The ratchet pawl is periodically disengaged from the ratchet rim by a casing 100. The bottom of the coin chute and also the bracket which carries the paper are made adjustable as to height and are for this purpose connected by a lever 151 pivoted at 149 and a rod 150 shown in Fig. 17 with the wing 50 of the coin holder which as before described is adjustable through the adjusting shaft 193, the action being such that when the diameter of the packet holder is reduced in size for the small coin both the bottom of the coin chute and the bracket which carries the roll of paper are raised proportionately. The purpose being to shorten the surplus paper at the lower end of the package which is to be folded down. A sliding piece 152 is attached to a cross-piece 153 filling the bottom of the chute by which the paper enters the machine. A diagonal slot 154 in the piece 150 receives the pin 155 and according to its position raises or lowers the piece 153. Another slot 146 in the rod 150 engages a pin 144 which in a similar manner raises the bracket 142.

The knife 164 is mounted or hinged at 165, a spring 166 keeps the knife normally away from the chute. At the moment when the paper is to be cut a lug 167 mounted on the gear wheel 5 comes in contact with the piece 168 attached to the upper part of the knife blade and forces it in, cutting the paper. A bracket 170 serves as a guide for the knife.

171 is a guide roller for the paper.

Figure 6:
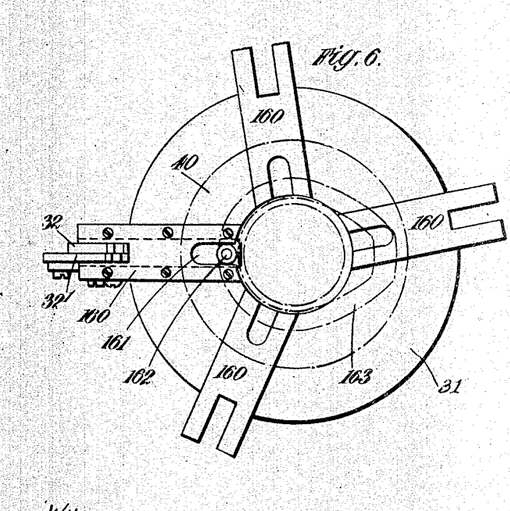

Attached to the hollow spindle at the top of the machine is a cam wheel 40, shown in Figs. 1, 6 and 12. This cam wheel receives momentum through the gear wheels 8 and 8′. The action being intermittent and effected through a fixed arm 10 with a ratchet pawl 12 engaging a ratchet rim 9 on the wheel 8 in a manner similar to that described for driving the winding mechanism. A detent pawl may be mounted on any portion of the framework or bracket and falling in a notch in the rim of cam wheel 40 serve to arrest momentum. Three rods 37, 38 and 39 (Figs. 1 and 4) carry platforms or brackets 30, 30′ and 31 to which are attached the folding mechanism. On the bracket 31 are four guides 160 (Fig. 6), traveling in these guides are four pieces 161 from which project four arms 162 carrying rollers which engage with the slot 163 in the cam 40 and are moved in and out. At the extremity of the pieces 161 I attach the ends of 4 sets of perpendicular levers 32, 32′ having fulcrums of varying lengths secured in projections from the bracket 31. The levers 32, 32′ are connected by means of arms or links 35′, 35′ with an upright bar 36. This upright bar engages with the folders and by traveling in and out successively operates them. These folders with corresponding levers are in four sets of two each; each set consists of one above and one below the packet holder which are operated simultaneously. These folders are mounted in carriages or guides 44 on the platforms 30, 30′. The lower platform may be rigidly secured to the upright rods, the upper platform is preferably mounted free and actuated by springs 47. This platform is adjustable for various positions on the rod to accommodate long or short packages and is raised or lowered by means of a cylindrical shaped piece 33, mounted on the adjusting shaft 220. This piece has a pin on its interior surface engaging a groove in the shaft so that it will turn with the shaft while being free to move up and down. Mounted on the rigid platform 30′ is a bracket 230 with a pin made to engage with a helical groove in the piece 33 so that turning the shaft will cause the piece 33 to rise or fall carrying the platform 30 with it. While I provide this adjustment for the general length of the packet I also provide a secondary adjustment to accommodate the variations due to worn coin. For this purpose the platform 30 is left free to rise against the action of gravity or the springs 47, the action of the top folders when pressing down the paper being to lift the platform 30 to which they are attached. In order that each folder may not have this work to do I provide a wedged shaped piece 231 (Figs. 1, 21, 21ᵃ) on the rim of a spring actuated piece 233 mounted on a stud 232. As the platform is raised this wedged shaped edge forces itself between the platform and a swivel arm 156 attached to the cylindrical piece 33 and keeps them apart until tripped by the spring actuated piece 234. This tripping is performed at certain intervals by the rod 111 which has a projection 135 which engages with the arm 134. The arrangement is such that the return inward of the arm 111 will not have any action on the wedge shaped piece. The piece 156 is kept in position by a post 157.

Reference to Figs. 5, 7, 9, 10, 11 will give the details of the folders which consist of two bars 71, 72, mounted in a carriage 44. Hinged to the bars 71 are fingers or folders proper 75. These are raised or lowered by the action of the bar 72. The upright bar 36 passes through openings in the bars 71 and 72; owing to a small spring catch 66 (Fig. 9) which falls into a receiving notch in the bars 71 the two bars move forward in unison until the bar 71 is arrested by the set screw 70 when by the continued movement the end of the bar 72 engages with and presses down the folder 75; a single bar 36 operating two folders simultaneously. These folders may be spring actuated or a small piece on the end of the bar 72 may engage a pin in the heel of the folder and bring it to an upright position on its return. The bar 72 when it has pressed down the finger passes on a short distance and locks it in its horizontal position, the catch 66 will then be in the notch 67 of the opposite bar and the two bars will move back together, the finger 75 being in a horizontal position as it is withdrawn from the coin package, securing thereby a better fold. The finger 75 is brought again to the upright at the end of the return movement. While this is the action of the first three sets of folders I provide a slightly different movement for the last set of folders which are supplemented by mechanism for tucking the end of the last fold under the edge of the preceding fold. In addition to finger 75 the last set of folders have a piece 80 made with a sharp edge and hinged to the piece 75. A longer movement is given to the bar 72 in this set of folders and after pressing the finger piece 75 to the horizontal continues its movement and gives a rotary turn to the piece 80. This action turns over the end of the last fold of the paper and tucks it under the edge of the last preceding fold. The piece 80 may be supplemented by a second piece 81 spring actuated which receives an additional pressure from the bar 72 and assists in securing a better action. The folder 75 may have mounted on it a loose piece 76 which actually contacts the paper and moving more freely than the piece 75 permits a better tucking action. The piece 80 may be spring actuated. The guides 44 on the last set of folders are hinged and secured by stud 73 with a spring 74 to the brackets 30, 30' so that the whole carriage will yield sufficiently to allow the blades 76 to rotate above the face of the coin to perform the tucking under of the last fold.

Figure 14:
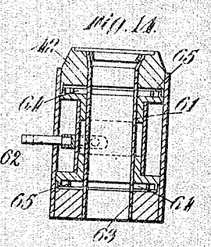
Figs. 14, 15 and 16 details of magazine.
Figures 15, 16:
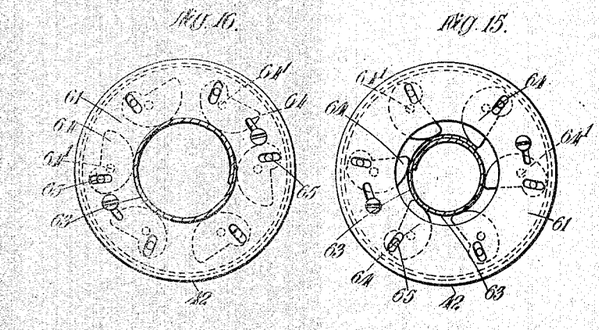

Attached to the bracket 60 at the top of the machine I provide a cylindrical magazine which has an interior tube 63 (Fig. 14) formed in the shape of a coil of thin metal, the size of this tube is regulated by two series of cams shown in detail in Figs. 15 and 16. These cams are mounted on pins 64' on the flanged ends of a cylindrical piece 61 which may be turned in the casing 42 by a lever 62. Pins 65 secured to the casing fall in slots in the cams and by securing partial rotation on the pins 64' cause a pressure on the cylindrical piece 63, thereby regulating the diameter. A link 195 connects by means of a stud 194 with a bracket on the regulating shaft 193 for the control. Under the magazine two spring actuated pieces or gates 180, 181 are hinged on stud 182 and are kept normally closed by spring 183. The outer extremities of these pieces are cut wedge shape in profile and the pieces are opened or separated by forcing between a pin or lug 184 attached to a lever 185. The lever 185 is pivoted on 186. Mounted on the bracket 2 is a spring actuated pawl or stop 190. This piece stands above the face of the bracket and intercepts the swinging arm 10 to arrest the motion of the machine. A projection from the lever 185 engages with this stop so that when the lever is swung to open the gates of the magazine the stop will be forced out of the way by the arm 10 which permits the machine to start; the gates however will not at once close as the projection from the lever is arrested by the end of the stop. When the arm has advanced a few degrees it contacts one end of the stop and releases the lever and brings the stop in position to arrest the machine after the next complete cycle of movements.

In adapting the machine to do various denominations of coins it is found necessary to adjust various parts to suit the varying diameter of the coins, and also independently arrange for packages of various lengths. It will be seen that I have connected by various devices all of the adjustments for the different diameters to a single long rod or shaft 193 suitably mounted on the machine. I provide this shaft with a handle or lever 199 which swings above a plate 198 on which suitable figures are arranged to indicate various coins. A steady pin on the lower face of the lever may be fitted to fall in depression in the plate to keep the lever in position.

The adjustments for the length of the packages are controlled by the rod 220 which is preferably geared to a horizontal rod 221 having a knob 219, a pointer attached to this shaft or knob will point when turned to figures on a dial 218. It is however desirable that the operator of the machine shall have both of these adjustments arranged for a particular coin packet before the machine is started, as otherwise damage might be done to the parts. To prevent such an accident I mount a fan shaped piece 202 so as to pivot on a traveling collar 215 threaded internally to be moved longitudinally by a thread on the piece 221; to an arm of the fan shaped piece I connect by a link 201 a bracket or arm 200 mounted on the shaft 193. A small pin 216 on the portion of the magazine gate 181 is positioned to fall in notches in the fan shaped piece if the numbers on the indices correspond and is so arranged that if they do not correspond it will be impossible to swing the gate or the lever 185 or start the machine. The driving shaft 3 may be provided with a ratchet wheel 45 controlled by a spring pawl 46 to prevent the action of the machine being reversed.

In describing the operation of the machine I will assume that the end of the paper has been fed in the machine and a receptacle formed for the article to be packeted in order that I may follow a natural sequence which would begin by placing the article to be packeted in the machine or in the magazine at the top of the machine and I will describe subsequently the method of forming the receptacle. Moving the lever 185 to the left will open the gate represented by the two pieces 180 and 181, permitting any article or articles to fall into the paper receptacle, they will be guided by the telescoping tube and arrested at the bottom by the top of the winding spindle. Moving the lever has permitted the arm 10 to push back the stop 190 and the machine is set in motion either by the crank arm 7' or other means of power which may be arranged. The ratchet pawl 15 being engaged with the ratchet rim motion is communicated to the winding spindle which is holding the lower edge of the paper by the gripper 29, a short movement serves to tighten the paper around the article in the receptacle. The pawl 15 is then thrown out of the ratchet rim 14 and the winding spindle comes to rest. The lug 167 operating the knife 164 the paper is then cut from the strip, simultaneously the telescoping tube is raised by the action of the cam wheel 110. The pawl again comes in mesh with the ratchet rim 14 and the end of paper is wrapped around the packet at the same time spring pressure on the section 51 of packet holder tightens the wrapping and the projection 112 spins an inner ridge just below the lowest coin in the packet. The additional pressure on 51 is obtained by tripping the spring post 55 which will be described later. The wrapping spindle then comes to rest. At the end of this movement the winding spindle is lowered. The folding operation is then begun. The ratchet pawl 12 will have passed the edge of the casing 11 and fall in mesh with the ratchet rim 9, setting in motion the wheels 8 and 8' and the cam wheel 40. This will advance successively the four sets of folders. When the last set of folders have turned down the fourth fold of paper at each end the pieces 80 80' will turn the edge of the last fold under the edge of the preceding one. On the return of the last long lever 32' the rod 111 attached thereto will swing open the hinged section 51 of packet holder and the finished packet will be ejected by the arm 58. The ratchet pawl 12 is then thrown out and the folding mechanism comes to rest. The receptacle for the next lot of coin is then formed as follows:—The cam 18 will raise the winding spindle and plug about 90% of its entire motion, depressing the spring 29' and at the same time the cam 110 will have lowered the telescoping tube 114. Almost simultaneously the feed roller 106 is started and the end of the paper guided by the pieces 50 and 51 and the plug below and the extension from telescoping tube above is given a partial turn in the packet holder. The winding spindle again performs its rotary movement and is raised to its full height, releasing the catch 95 and permitting the arm 29 actuated by spring 29' to grip the paper, assisting in forming a complete turn of the paper, thus shaping the receptacle for the next article to be packeted. Simultaneously with the beginning of this movement of the winding spindle an arm 69 intercepts the lever 99 and by lifting the rod 98 presses on the spring post 55 and trips the rod 111, the gate 51 does not however return entirely but is arrested by the ejector piece 58 coming in contact with the head of the spring post 55. A second tripping action is performed when the final winding operation is performed by again raising the post 55 so that the piece 58 falls below the head on the smaller part of the shaft of 55, thus enabling the full pressure of the spring 56' to be exerted on the coin packet. The second tripping action is performed by the piece 24 on the winding spindle. The machine is arrested after one complete circle by the lug 190 which intercepts the arm 10 on driving shaft.

Having thus particularly described and ascertained the nature of my said invention and in what manner the same is to be performed, I declare that what I claim as my invention is—

1. A coin packeting machine having formers for shaping the coin receptacle consisting of outer and inner members, the outer member being in two parts, one of which is arranged to swing outward or be displaced to eject the packeted article.

2. A coin packeting machine having formers for shaping a coin receptacle consisting of an outer casing as 50—51, an interior former at the bottom as 94, an interior former at the upper end as 125 and means for adjusting the circumference of each in order to form receptacles of varying diameters.

3. In a machine of the class described, members arranged to insert horizontally a strip of paper and to form a cylindrical coil, members arranged to place the article to be packeted in the shaped coil, members designed to fold the ends of the coil and a member as 58 which by a lateral movement ejects the packet.

4. A packeting machine having a central member positioned to receive paper or covering, members above and below serving as interior guides or formers for shaping the covering, folders for closing the ends of the packet and means for withdrawing the formers while the folding is being performed.

5. A packeting machine having a central member positioned to receive paper or covering, members above and below serving as guides or formers for shaping the covering, folders for closing the ends of the packet and means for forming an interior crease or ridge in the covering to support the coins while the ends of the packet are being folded.

6. A packeting machine having a central member positioned to receive paper or covering, members arranged to introduce the end of the paper, a member arranged to grip the edge of the paper and form it into a coil for the reception of an article to be packeted and by a further movement after the article has been introduced to tighten the paper upon the article.

7. A packeting machine having a central member positioned to receive paper or covering, members above and below serving as interior formers or guides for the paper, folders arranged to press down the ends of the paper, the folders being capable of moving in both upright and horizontal positions so as to advance to the packet in an upright position, to press down the paper and to withdraw while in a horizontal position.

8. A packeting machine having centrally positioned formers for a receptacle, members arranged to introduce the material of which the receptacle is formed, members arranged to introduce the article to be packeted into the receptacle, folders for closing the ends of the receptacle and a member arranged to turn the end of the final fold under the edge of a preceding fold.

9. A packeting machine having centrally positioned formers for a receptacle, members designed to feed the paper or covering to the formers from a roll, a member designed to hold the roll of paper, a guide or chute forming a passage for the paper and means for raising or lowering the paper holder and the chute to suit various sizes of packets.

10. A packeting machine having centrally positioned formers for a receptacle, a magazine for holding the article to be introduced, and a member arranged to regulate in unison the diameter of the formers and the magazine.

11. A coin packeting machine having formers for shaping the coin receptacle consisting of an outer casing or guide and two inner formers each being adjustable longitudinally and circumferentially.

12. A packeting machine having centrally positioned formers for a receptacle, members designed to introduce the material of which the receptacle is formed, a plurality of folders arranged to close the upper and the lower ends of the receptacle and means for adjusting the position of the folders relatively to each other.

13. A packeting machine having centrally positioned formers for a receptacle, a plurality of adjustable folders for closing the ends of the packet, the upper former being arranged to introduce the article to be packeted and provided with telescoping mechanism for adjusting the length and means for moving it in unison with the adjustment of the folders to accommodate articles of varying length.

In testimony whereof I have signed my name to this specification in the presence of two subscribing witnesses.

CHARLES LAURENCE BURDICK.

Witnesses:
A. J. TANNER,
ROY KING.